(12) United States Patent
Wu et al.

(10) Patent No.: US 8,184,399 B2
(45) Date of Patent: May 22, 2012

(54) MAGNETIC WRITE HEAD WITH THIN AND THICK PORTIONS FOR BALANCING WRITABILITY AND ATE

(75) Inventors: Yan Wu, Cupertino, CA (US); Moris Dovek, San Jose, CA (US); Zhigang Bai, Milpitas, CA (US); Cherng-Chyi Han, San Jose, CA (US); Jiun-Ting Lee, Sunnyvale, CA (US); Po-Kang Wang, Los Altos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 88 days.

(21) Appl. No.: 12/924,416

(22) Filed: Sep. 27, 2010

(65) Prior Publication Data

US 2012/0075749 A1   Mar. 29, 2012

(51) Int. Cl.
*G11B 5/127* (2006.01)
(52) U.S. Cl. .................................. 360/125.15
(58) Field of Classification Search .............. 360/125.15
See application file for complete search history.

(56) References Cited

U.S. PATENT DOCUMENTS

| | | | |
|---|---|---|---|
| 5,600,519 A | 2/1997 | Heim et al. | |
| 6,693,768 B1 * | 2/2004 | Crue et al. | 360/125.12 |
| 6,813,116 B2 * | 11/2004 | Nakamura et al. | 360/125.12 |
| 7,133,252 B2 | 11/2006 | Takano et al. | |
| 7,322,095 B2 | 1/2008 | Guan et al. | |
| 7,394,621 B2 | 7/2008 | Li et al. | |
| 7,430,095 B2 * | 9/2008 | Benakli et al. | 360/125.15 |
| 7,672,079 B2 * | 3/2010 | Li et al. | 360/125.02 |
| 7,804,662 B2 | 9/2010 | Chen et al. | |
| 7,869,161 B2 * | 1/2011 | Luo et al. | 360/125.02 |
| 7,934,310 B2 * | 5/2011 | Guan et al. | 29/603.16 |
| 8,031,433 B2 * | 10/2011 | Yan et al. | 360/125.03 |
| 2005/0219743 A1 | 10/2005 | Guan et al. | |
| 2007/0217074 A1 | 9/2007 | Zhou et al. | |
| 2007/0230046 A1 * | 10/2007 | Le et al. | 360/126 |
| 2008/0112082 A1 | 5/2008 | Guan et al. | |
| 2008/0316653 A1 | 12/2008 | Sasaki et al. | |
| 2009/0207525 A1 * | 8/2009 | Guan et al. | 360/125.12 |
| 2011/0051293 A1 * | 3/2011 | Bai et al. | 360/313 |
| 2011/0273800 A1 * | 11/2011 | Takano et al. | 360/125.12 |

\* cited by examiner

*Primary Examiner* — Mark Blouin
(74) *Attorney, Agent, or Firm* — Saile Ackerman LLC; Stephen B. Ackerman

(57) ABSTRACT

A perpendicular magnetic recording (PMR) head is fabricated with a tapered main pole having a variable thickness. The tapered portion of the pole is at the ABS tip and it can be formed by bevels at the leading or trailing edges or both. The taper terminates to form a region with a maximum thickness, $t_1$, which extends for a certain distance proximally. Beyond this region of maximum thickness $t_1$, the pole is then reduced to a constant minimum thickness $t_2$. A yoke is attached to this region of constant minimum thickness. This pole design requires less flux because of the thinner region of the pole where it attaches to the yoke, but the thicker region just before the tapered ABS provides additional flux to drive the pole just before the ABS, so that high definition and field gain is achieved, yet fringing is significantly reduced.

27 Claims, 5 Drawing Sheets

MAGNETIC WRITE HEAD WITH THIN AND THICK PORTIONS FOR BALANCING WRITABILITY AND ATE

BACKGROUND OF THE INVENTION

1. Field of the Invention

This invention relates generally to magnetic recording heads, particularly to perpendicular recording heads that produce recording magnetic fields that are largely perpendicular to the recording medium surface. More specifically, the invention relates to a magnetic pole of a recording head having a tapered shape that allows a more efficient delivery of a magnetic recording field to a recording medium while minimizing the effects of adjacent track erasure (ATE) and wide area track erasure (WATE).

2. Description of the Related Art

The increasing need for high recording area densities (>100 Gb/in$^2$) is making the perpendicular magnetic recording head (PMR head) a replacement of choice for the longitudinal magnetic recording head (LMR head).

By means of fringing magnetic fields that extend between two emerging pole pieces, longitudinal recording heads form small magnetic domains with the magnetic moment in each domain pointing within the surface plane of the magnetic medium (hard disk). As recorded area densities increase, these domains must correspondingly decrease in size, eventually permitting thermal effects to destabilize the small magnetic domains. This occurrence is the so-called superparamagnetic limit.

Recording media that utilize perpendicular magnetic recording, allow domain structures within a magnetic layer to be formed with the net magnetic moment in each domain having a perpendicular orientation relative to the disk surface, while a soft magnetic underlayer (SUL) formed beneath the magnetic recording layer serves to channel a return flux back to the head to strengthen the recording field during the writing process. Thus, a magnetic recording head that produces a field capable of forming domains perpendicular to a disk surface, when used in conjunction with such perpendicular recording media, is able to produce more stable domain configurations with much higher area densities than is possible using standard longitudinal recording.

Although the magnetic media used in conjunction with perpendicular writing are capable of storing a high area density, the write head itself must be able to produce magnetic fields of sufficient intensity and definition to make use of the media's capabilities. One approach to matching the writer capabilities to those of the media is to fabricate a magnetic pole tip that tapers in thickness towards the ABS end (the end adjacent to the recording medium). Such a design makes the pole thicker away from the ABS but presents a smaller footprint where it emerges at the ABS, yet it delivers more flux. U.S. Pat. No. 7,322,095 and U.S. Patent Applications 2008/0112082 and 2005/0237665 (Guan et al.) show such a main pole tapered preferably at its trailing edge and shielded on four sides.

FIG. 1 shows a highly schematic diagram of a side cross-sectional view of a prior art PMR single pole writer positioned above a moving magnetic media (16) such as a magnetic disk. Although the disk is rotating about a central axis, in this part of the figure it is moving locally relative to the main pole of the writer in the direction of the arrow (180). The "leading edge" (indicated in the figure by the legend "Leading Edge") of the main pole denotes the edge or surface towards which the disk is moving. The opposite surface of the pole is its trailing edge. Typically, a read head, which is not shown here, would be formed to the leading edge side of the writer, so an area on the disk moves past the read head before passing beneath the writer. For consistency of description, a set of orthogonal x, y, z axes define directions in this and remaining figures that display a PMR writer or describe its performance. The positive x-direction points in the direction of disk motion, the positive y-direction points to the rear of the writer, which is away from the ABS surface, the z-direction points towards adjacent tracks in the plane of the disk.

The main pole of the writer (14) is in physical and magnetic contact with a portion of a yoke (18) which in this case is attached (eg. by plating) on "top" of the pole (on its trailing edge) and is, therefore, called a top yoke. Magnetic flux is emitted from the pole tip (19) at its air bearing surface (ABS) at which region it "writes" on the disk by aligning the magnetic moments in the nearby magnetic grains within the disk surface. The flux that exits from the pole tip at (19) passes through the medium and the SUL and returns to the return portion of the yoke (15) to complete a flux loop. The magnetic flux is created by a magnetic field induced by a current in the coil windings (12) wrapped around the pole. One exemplary coil of such coil windings (12) is shown.

Referring now to FIG. 2, there is shown a prior art approach to shaping a main pole so that the flux leaving the ABS surface (19) is more narrowly confined and is able to write with higher definition on smaller regions of the disk surface. The main pole (14) is shown here as being attached to a top yoke (18), as in FIG. 1 (although the view is reversed).

In this design, the ABS tip of the main pole is tapered (narrowed) towards the ABS surface which forms the distal end of the pole. The taper is produced by beveling the tip of the main pole at both its trailing edge (192) and its leading edge (191), although it is possible to have only one of the edges tapered. When the taper terminates, the pole retains a constant thickness until its proximal end, which, as the terms "proximal" and "distal" will be used herein, is the end farthest from the (distal) ABS, end.

The methods by which the pole tip is tapered and the general design of the taper are also taught in the following patents and published applications.

U.S. Patent Application 2005/0219743 (Guan et al—Headway) discloses that the main pole may be tapered at the leading or the trailing edge.

U.S. Pat. No. 7,133,252 (Takano et al) shows that the main pole may be tapered at the leading edge or the trailing edge or both.

U.S. Pat. No. 5,600,519 (Heim et al) discloses a tapered pole tip.

U.S. Patent Application 2008/0316653 (Sasaki et al). FIG. 12 shows the pole tapered and the nonmagnetic layer 17 also tapered.

Although the various tapered pole configurations described above have advantages when compared to pole tips that are not tapered, such as improved field strength, they also possess certain shortcomings. In particular, the thicker region of the pole tip (the region proximal to the ABS taper) causes increased flux to be channeled into the surrounding region around the main pole, in addition to some enhancement of flux density within the main pole, causing significant fringing of the emerging magnetic field when it emerges at the pole tip. This fringing, which can be exacerbated by shield configurations, leads to track erasures on adjacent tracks (ATE) as well as on tracks within a wider area (WATE). In addition, the length of the thicker region of the pole (proximal to the taper) will contain a large amount of flux, a small part of which is then concentrated within the tapered region to produce the improvement in writing flux intensity along with significant fringing. This implies that there is a great deal of magnetic flux circulating within the head in order to produce the required concentrated flux at the tip. It would be desirable to create a pole tip design that provides the necessary enhancement for writing within very small areas, while minimizing ATE and WATE and also reducing the net amount of flux circulating within the head.

SUMMARY OF THE INVENTION

A first object of this invention is to provide a pole structure for a perpendicular magnetic recording (PMR) writer capable of recording at high area densities.

A second object of the present invention is to provide such a pole structure for a perpendicular magnetic recording head in which the write magnetic field is increased by means of more efficient provision of magnetic flux to the ABS of the pole tip through use of a tapering shape.

A third object of the present invention is to provide a PMR writer with a pole structure having enhanced writing capabilities at narrow track widths yet able to produce minimal or no degradation of information written to adjacent tracks (ATE) and to tracks within a wide area (WATE) surrounding the track being written upon.

A fourth object of the present invention is to provide a PMR writer with reduced flux content in a certain region of the head, that nevertheless achieves the above objects.

A fifth object is to provide a method of fabricating the pole structure meeting the objects set forth above.

The objects of the present invention are realized by the formation of a tapered write pole with a variable thickness, where thickness is the distance between leading and trailing edge surfaces and the variability is in the direction perpendicular to the ABS plane. These variations are schematically illustrated in the embodiments of FIG. 3, FIG. 4 and FIG. 5 and will be described below. The write pole is thin and of constant thickness in a region that is proximal to (far to the rear of) the ABS tip surface and within which region it is fastened to a yoke on a top or bottom surface. The write pole then thickens in a middle region located distally towards the ABS tip surface and, finally, this thicker region is tapered to form the final region that includes the ABS tip. This pole design allows the use of less total flux to drive the main pole because of the thinner region of the pole where it attaches to the yoke; but the thicker region just before the tapered ABS provides additional flux concentration power to drive the pole just before the ABS, so that a higher field under the main pole is achieved, yet the field in the adjacent region is significantly reduced compared to the design illustrated in FIG. 2. It is noted that the pole cross-sectional shape in planes parallel to the ABS plane is typically triangular or trapezoidal, which provides a taper in a direction from leading to trailing edge. The present invention is for a tapered shape that is in addition to this taper.

DESCRIPTION OF THE PREFERRED EMBODIMENTS

The preferred embodiment of the present invention is a variable thickness, tapered main write pole structure for use within a perpendicular magnetic recording (PMR) head. Note that thickness is measured perpendicularly between the trailing edge and the leading edge of the pole and the variability of the thickness is along a direction perpendicular to the ABS plane. It is also noted that the thickness variations to be described herein are in addition to whatever cross-sectional tapering is used to give the pole tip a typical triangular or trapezoidal shape in the ABS plane.

A tapering occurs in a first region and produces an increasing thickness of the pole tip away from the ABS of the pole. This tapering is produced by beveling the ABS at a trailing edge surface, a leading edge surface or both. The taper terminates at a region having a constant and maximum thickness. Note that the taper need not be symmetric, but its termination, (where the longest bevel terminates if there are two bevels of differing lengths) will mark the beginning of a region of constant maximum thickness.

After the termination of the pole tip taper, a second region of the main pole is formed, within which the main pole continues to extend proximally (away from the ABS) while maintaining the constant and maximum thickness attained at the taper termination. This thickest, second region of the pole then terminates and a transition region, denoted hereinafter the fourth region, of reducing thickness is formed.

The reduction in thickness within the transition region is created by beveling the pole either once on its leading edge, or once on its trailing edge or twice, on both edges.

Finally, having attained this reduced thickness within the (fourth) transition region, the main pole extends to its proximal end as a third region which maintains this constant reduced thickness. A top or bottom yoke is attached to this third region creating a physical bond and providing magnetic continuity. Note that a top yoke will be shown as an exemplary formation only.

Figure 1:
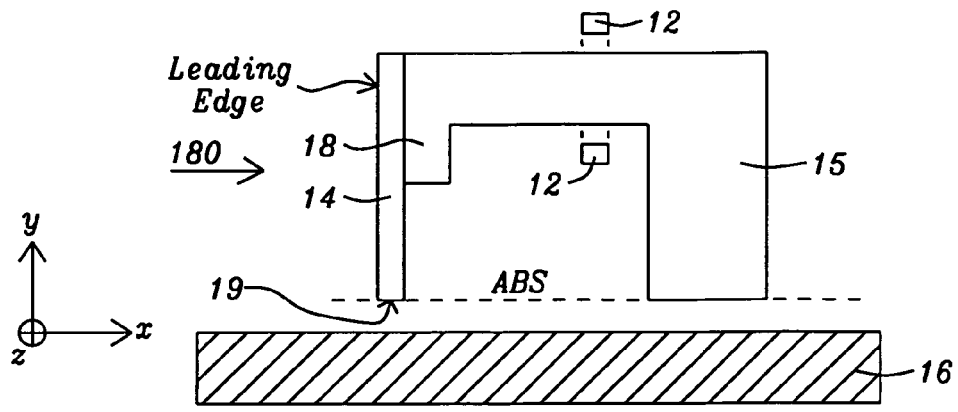
FIG. 1 is a schematic representation of side cross-sectional view of an exemplary prior art PMR having a single main pole.
Figure 2:
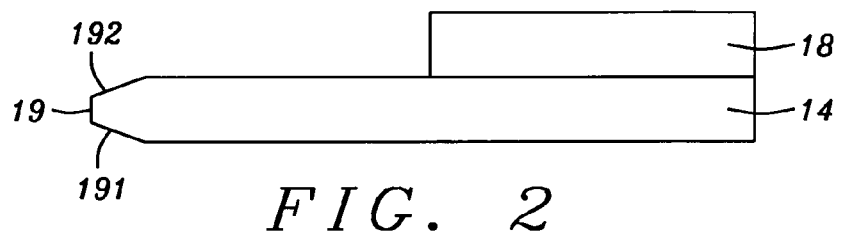
FIG. 2 is a schematic side cross-sectional view of a prior art main pole having a tapered shape for improved writing definition.
Figure 3:
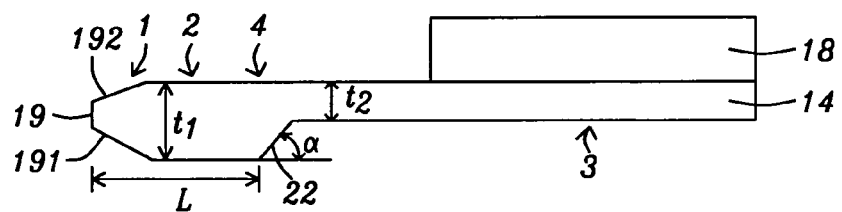
FIG. 3 is a schematic illustration of an embodiment of the present invention.

Referring now to FIG. 3, there is shown a schematic side cross-sectional view in an x-y plane (as defined in FIG. 1) of a first embodiment of the present invention. It is understood that this cross-section typically passes through a line of symmetry in the y-z plane. It is also understood that in all that follows the thickness is measured (in this cross-section) in the x-direction as the separation between the leading and trailing edges of the pole, and the variations in thickness occur in the y-direction, moving from the distal ABS end of the first region of the pole, to a proximal end of the third region. In this embodiment, the main pole (14) is fastened to a top yoke (18) at the trailing edge of the third region (3) of constant minimal thickness $t_2$ that is proximal to the ABS. The main pole is tapered at the leading edge (191) and trailing edge (192) sides of its ABS (19) to form a first region (1) of increasing thickness proximally. It is to be noted, that the tapering need not be on both edges but may be on either the leading or trailing edge. It is also noted that the taper refers to a thickening of the pole away from the ABS end.

As is shown in the figure, the tapering (thickening) away from the ABS end terminates and the pole tip attains a maximum thickness, $t_1$, which is between approximately 0.15 microns and 0.5 microns. This second region (2) of constant maximum thickness $t_1$ then extends proximally to form a transitional region (4), also referred to hereinafter as a fourth region.

Within the transition region (4) a further beveling (22) of the leading edge occurs to reduce the thickness of the pole to the lesser thickness, $t_2$ ($t_1 > t_2$) of the third region, which thickness is between approximately 0.05 and 0.35 microns. The length of the pole tip between its ABS end (19) and the beginning of the thickness reduction by the bevel (22), is denoted L, which is in the range between approximately 0.3 and 1.5 microns. L is therefore the total length of the first plus the second regions. The bevel (22), which reduces the thickness from $t_1$ to $t_2$, makes an angle, $\alpha$, with the leading edge, where $\alpha$ is in the range between approximately 15° and 90°.

Figure 4:
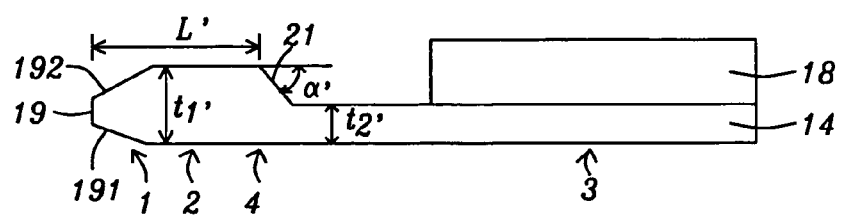
FIG. 4 is a schematic illustration of an embodiment of the present invention.

Referring to FIG. 4, there is shown a schematic side cross-sectional view of a second embodiment of the present invention wherein a reduction of pole thickness occurs at the trailing edge of the pole. In this embodiment, as in the previous embodiment, a main pole (14) is fastened beneath a top yoke (18) at its third region (3) of constant minimum thickness. The first region (1) of the main pole is tapered at its leading edge (191) and at its trailing edge (192) and thickens away from an ABS (19). It is to be noted, that the tapering need not be on both edges but may be on either the leading or trailing edge.

As is shown in the figure, the tapering terminates and a second region (2) of constant maximum thickness is formed within which the pole tip attains a maximum thickness, $t_1'$, which is in the range between approximately 0.15 microns and 0.5 microns.

A transition region (4) begins as a further beveling (21) of the trailing edge, which serves to reduce the thickness of the pole to a lesser thickness, $t_2'$ (the constant thickness of the third region), which is in the range between approximately 0.05 microns and 0.35 microns ($t_1' > t_2'$). The length of the pole tip between its ABS end (19) and the beginning of the bevel (22) is denoted L' (the length of the first plus second regions), which is in the range between approximately 0.3 microns and 1.5 microns. The bevel (21), which reduces the thickness from $t_1'$ to $t_2'$ makes an angle, $\alpha'$, with the leading edge, where $\alpha'$ is in the range between approximately 15° and 90°.

Figure 5:
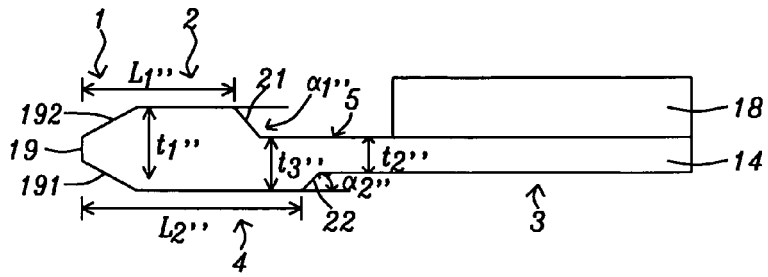
FIG. 5 is a schematic illustration of an embodiment of the present invention.

Referring to FIG. 5, there is shown a schematic side cross-sectional view of a third embodiment of the present invention wherein the reduction of pole thickness occurs at both the leading and trailing edges of the pole, producing a transition region in which two reductions of thickness occur. In this embodiment, a main pole (14) is fastened beneath a top yoke (18) at a third region (3) of the main pole.

In a first region (1) the main pole is tapered at its leading edge (191) and at its trailing edge (192) and thickens away from an ABS (19) until it attains a maximum thickness $t_1''$. It is to be noted, that the tapering need not be on both edges but may be on either the leading or trailing edge.

As is shown in the figure, when the tapering terminates a second region (2) is formed in which the pole tip attains and maintains a maximum thickness, $t_1''$, which is in the range between approximately 0.15 microns and 0.5 microns. This second region of maximum thickness so formed extends proximally until a first transition region (4) is formed by a first beveling (21) of the trailing edge. This beveling reduces the thickness of the pole to an intermediate lesser thickness $t_3''$. Following this first beveling, a second transition region (5) is formed by a beveling of the trailing edge (22) to reduce the pole yet again to a final thickness, $t_2''$, which is always less than $t_1''$ and which is within the range between approximately 0.05 microns and 0.35 microns. The length of the pole tip between its ABS end (19) and the beginning of the first transition region (4) at the first bevel (21) is denoted $L_1''$, which is between approximately 0.3 microns and 1.5 microns. The first bevel (21) makes an angle, $\alpha_1''$, with the trailing edge, where $\alpha_1''$ is between approximately 15° and 90°.

The length of the pole tip between the ABS end (19) and the beginning of the second transition region (5) at the second bevel (22) is denoted $L_2''$, which is between approximately 0.3 microns and 1.5 microns. The second bevel occurs at an angle $\alpha_2''$ to the leading edge, where $\alpha_2''$ is between approximately 15° and 90°.

While $L_1''$ is preferably made equal to $L_2''$, this is not a necessity. However, $t_1$, $t_1'$ and $t_1''$ are always greater than $t_2$, $t_2'$ and $t_2''$ respectively. Note that the dimension of the intermediate thickness $t_3''$ is a result of the other dimensional constraints and is not proscribed here.

Figure 6:
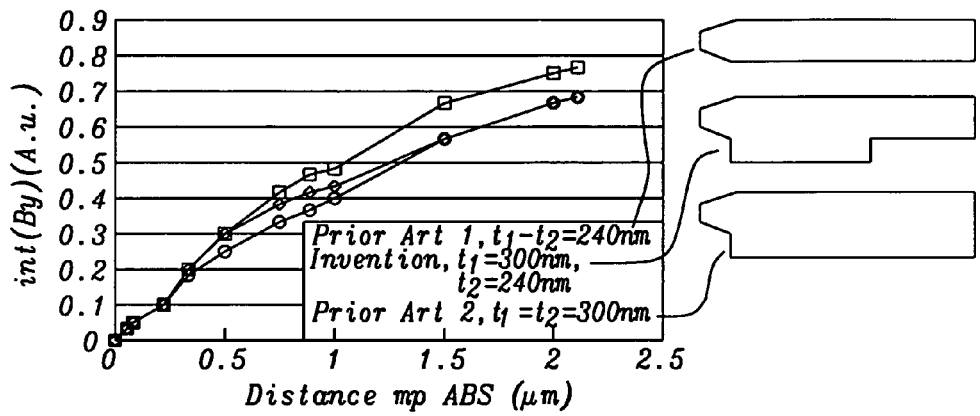
FIG. 6, is a graphical illustration showing the integrated magnetic flux in the cross-section of the pole as a function of the distance from that cross-section to the ABS, comparing different geometries related to the present invention.

Referring to FIG. 6, there is shown a graphical representation comparing the performance of three pole tip designs. Tip 1, is a prior art tapered pole of uniform thickness, $t_1 = t_2 = 240$ nm); tip 2 is the variable thickness tapered pole of the present invention ($t_1 = 300$ nm, $t_2 = 240$ nm) and tip 3 is a prior art type pole with an increased, but uniform, thickness beyond the tapered region ($t_1 = t_2 = 300$ nm). The graphs indicate the integrated flux (integrated $B_y$) across a horizontal cross-section (in the x-z plane of FIG. 1) of the pole tip at multiple positions (measured in microns away from the ABS) along the vertical direction (along the y-axis of FIG. 1). As the graphs show, the present invention (tip 2) achieves comparable total magnetic flux at a distance of 20 nm or less above the ABS, while the thinner rear portion (at a distance >1 micron) requires less incoming driving flux.

Figure 7:
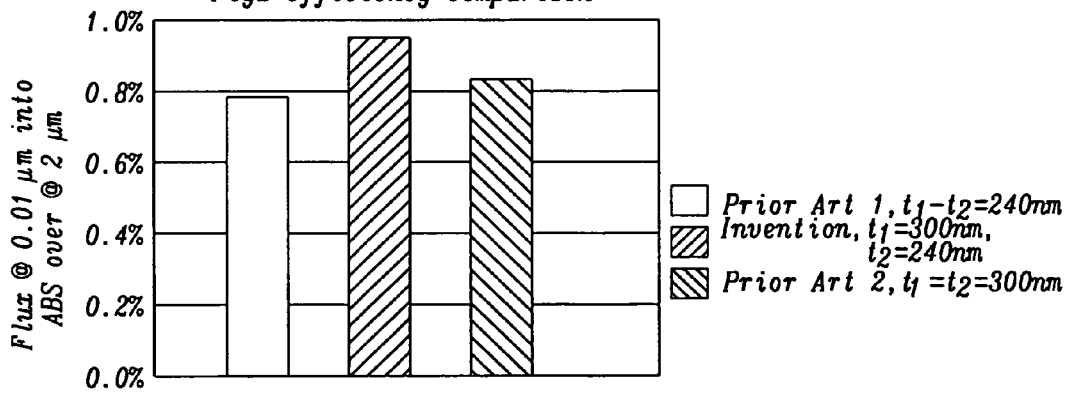
FIG. 7 is a graphical representation showing flux delivery efficiency comparisons between the present invention and the prior arts.

Referring next to FIG. 7, there is shown another graphical illustration comparing the efficiencies of the three pole designs of FIG. 6. Efficiency is defined for this purpose as the ratio between the total flux at a distance of 10 nm (0.01 microns) from the ABS (into the pole) and the incoming flux at 2 microns (rear end of the pole). The present invention has 15% greater efficiency than the prior art designs.

Because there is less incoming driving flux needed to produce the same write field at the ABS of the pole, there will be less leakage from the pole into the surrounding shields and, consequently, less fringing into adjacent and surrounding tracks and improved ATE and WATE performance.

Figure 8:
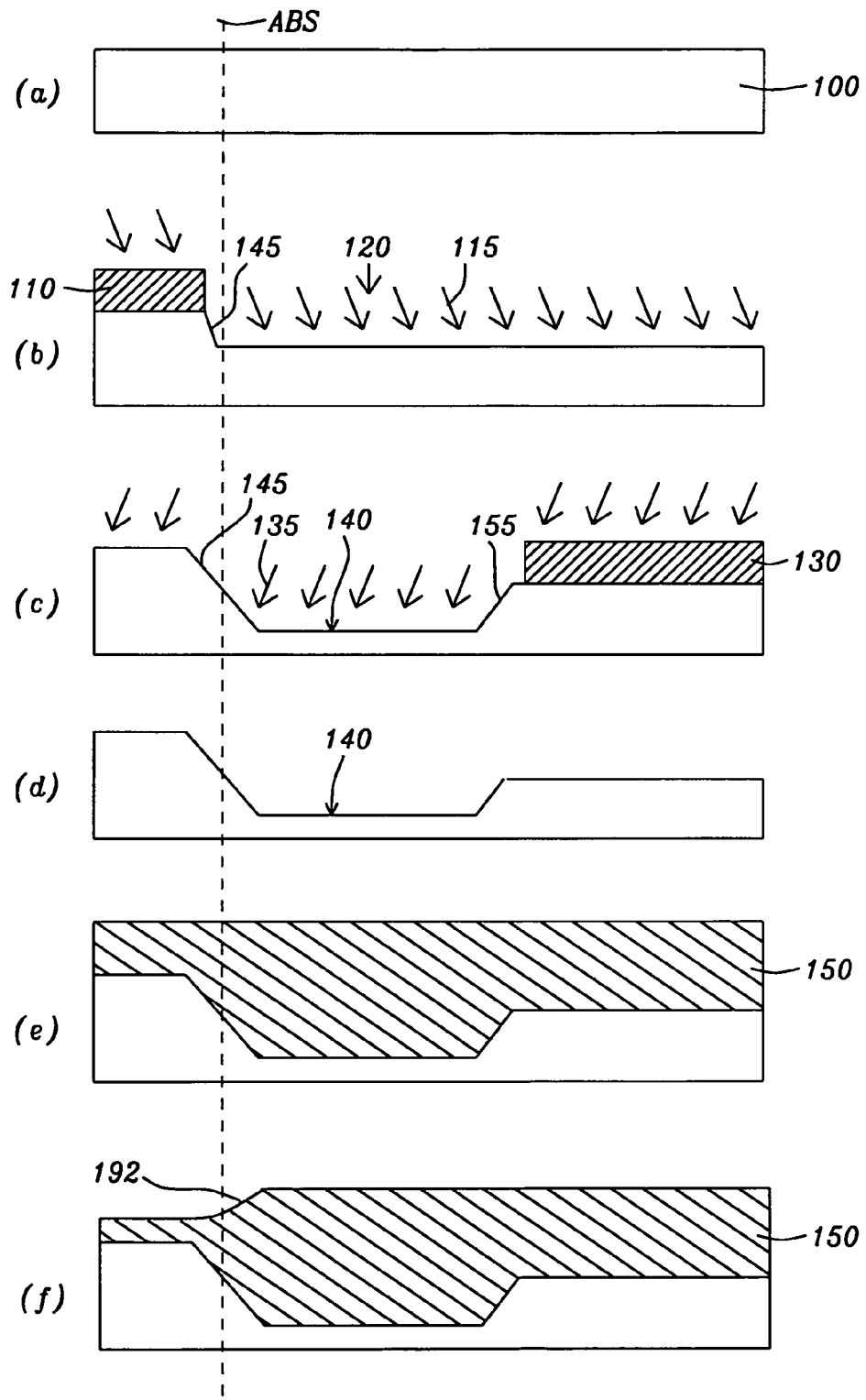
FIG. 8 is a schematic illustration of one possible sequence of process steps (a)-(f) used to fabricate a design of the main pole of the present invention with a thick and a thin portion.

The thick and thin portions of the main pole described in FIG. 3, FIG. 4 and FIG. 5 can be formed by several methods. FIG. 8 (a-f) and FIG. 9 (a-g) following will show two methods of forming the design with a thick portion on the bottom side, as shown in FIG. 3 and FIG. 5. FIG. 10 (a-c) will show a method of forming the shape on the top side as shown in FIG. 3 and FIG. 5. Note that the first step (a) shown in FIG. 10 is actually the last step (f) of FIG. 8, or the last step (g) of FIG. 9, or it can be the first process step that begins with a main pole that has its trailing edge tapered formation completed but that lacks a bottom thick portion as shown in FIG. 4.

Referring now to step (a) of FIG. 8, there is shown schematically a side cross-sectional view of a first material layer, preferably such as a layer of $Al_2O_3$ (100), deposited on a substrate (not shown). Note that a vertical dashed line defines the ABS position of the pole tip being formed in each of the following illustrations.

Referring next to step (b) of FIG. 8, there is shown schematically the fabrication of FIG. 8a wherein a first photo-resist mask (110) has allowed an ion beam etch (IBE) or reactive ion etch (RIE) (arrows (115)) to create a first trench (120) in that first material layer. Note that the application of the etch process and the positioning of the mask allows the formation of a tapered end surface (145) of the trench. This tapered trench surface will subsequently create a corresponding tapered surface on a layer of material deposited within the trench.

Referring next to step (c) of FIG. 8, there is shown schematically the fabrication after the step (b) of FIG. 8, where the first photo-resist mask ((110) of FIG. 8 step (b)) has been removed and a second photo-resist mask (130) has been applied. The second mask then permits a second IBE or RIE (arrows (135)) process step to deepen (140) the first trench. Note that the location of the mask and the application of the etching process permit the formation of a second tapered surface (155) of the trench along with possible modification of the first tapered surface (145).

Referring next to step (d) of FIG. 8, there is shown schematically the fabrication of FIG. 8, (c), wherein the second photo-resist mask has been removed, leaving the deepened trench (140) in the substrate.

Referring next to step (e) of FIG. 8, there is shown schematically the fabrication of step (d) of FIG. 8 wherein a layer of main pole material (150) such as an alloy of Fe and Co has been plated over the substrate trench, conformally filling the trench to a maximum thickness $t_1$ as required by the shape of the main pole. The upper surface of the plated layer (150) is planarized (rendered smooth and planar) by a method such a CMP (chemical mechanical polishing).

Referring finally to (f) of FIG. 8, there is shown schematically the results after the formation of the trailing edge taper, which could be produced by a sequential "photo-resist application/IBE/photo-resist removal" process similar to that already illustrated in (b) of FIG. 8. The leading edge taper is already defined by the shape of the trench (145).

Figure 9:
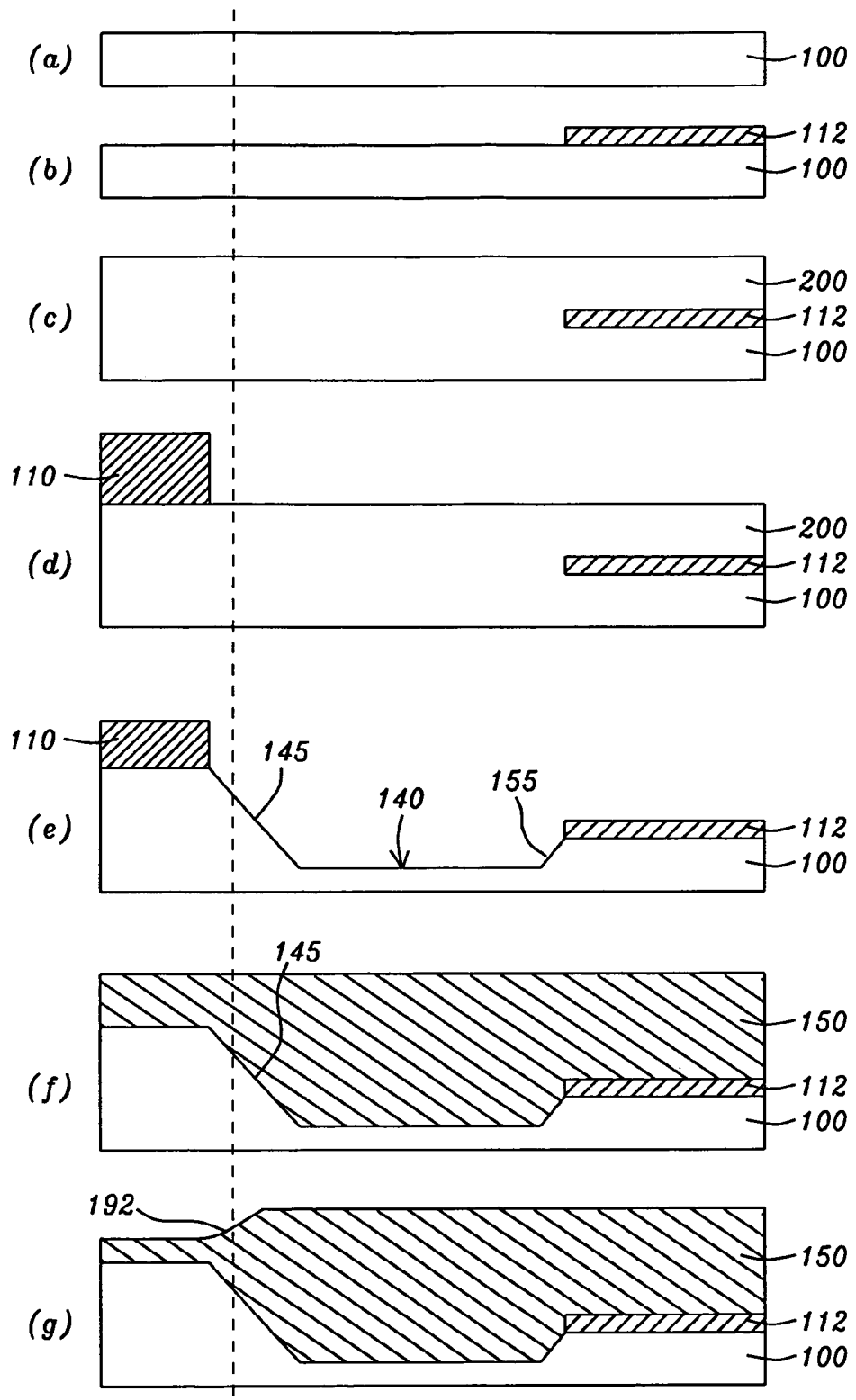
FIG. 9 is a schematic illustration of another possible sequence of process steps (a)-(g) used to fabricate a design of the main pole of the present invention with a thick and a thin portion.
Figure 10:
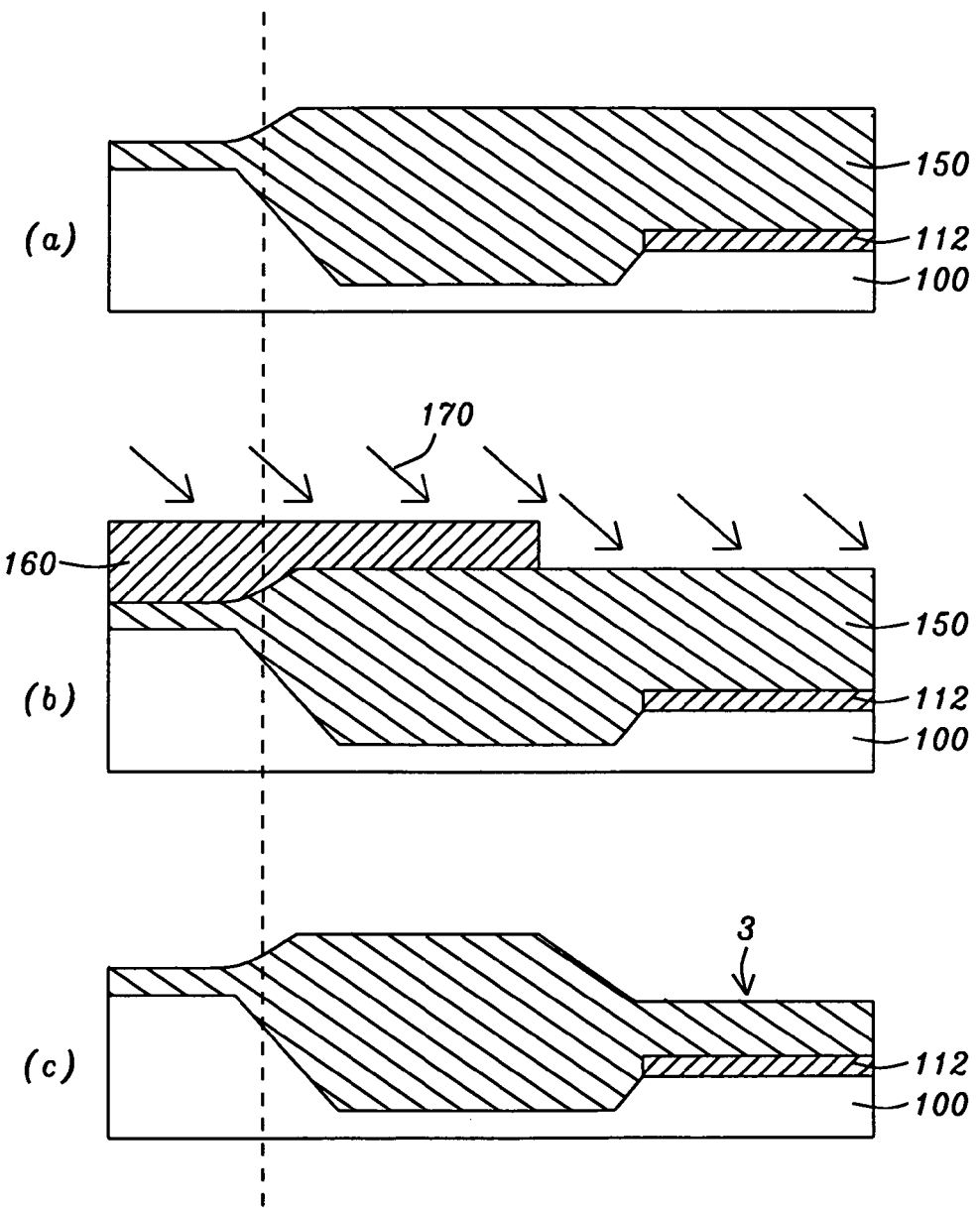
FIG. 10 is a schematic illustration of a sequence of process steps (a)-(c) used to fabricate an alternate design of the main pole of the present invention with a thick and a thin.

Referring now to (a) of FIG. 9, there is shown schematically a side cross-sectional view of a first step in an alternative method (alternative to that of the (a)-(f) sequence of FIG. 8) for forming the bottom portion of the present variable thickness tapered pole. In this step there is shown the deposition of a first material layer, preferably such as a layer of $Al_2O_3$ (100), deposited on a substrate (not shown). Note that a vertical dashed line defines the ABS position of the pole tip being formed in each of the following illustrations.

Referring next to (b) of FIG. 9, there is shown schematically the fabrication of (a) of FIG. 9, where a lift off deposition of a metal etch-stop layer (112) has been formed over a portion of the $Al_2O_3$ layer (100). This layer will limit the etching to material in the covered region after the covering material has been removed.

Referring next to (c) of FIG. 9, there is shown schematically the fabrication of (b) of FIG. 9 where an additional layer (200) of the $Al_2O_3$ material has been deposited over the fabrication. The resulting fabrication is planarized by a surface polishing method such as CMP.

Referring next to (d) of FIG. 9, there is shown schematically the fabrication of (c) of FIG. 9 where a photo-resist mask (110) has been applied.

Referring next to (e) of FIG. 9, there is shown schematically the fabrication of (d) of FIG. 9, following an RIE process (not shown, but analogous to that in (b) of FIG. 8) has been applied. The region not covered by the photo-resist (110) and the etch-stop layer (112) can be etched more deeply than the region covered by the etch-stop layer (112) when directional RIE is employed as the etching process. The photo-resist mask (110) allows the formation of the sloped side of the trench (145). The opposite sides of the trench, (145) and (155) have been oppositely sloped by the application of the RIE process.

Referring next to (f) of FIG. 9, there is shown schematically the fabrication of (e) of FIG. 9, where the photo-resist mask has been removed and a layer of main pole material (150) has been plated conformally within the trench to a maximum thickness of $t_1$ as required by the dimensions of the main pole. A leading edge taper is created by the sloped side of the trench (145).

Referring finally to (g) of FIG. 9, there is shown schematically the fabrication of (f) of FIG. 9f, where an IBE has been applied to create the trailing edge taper (192) of the main pole similarly to that which is shown in (f) of FIG. 8.

Referring now to (a) of FIG. 10, there is shown schematically the equivalent fabrication of (f) of FIG. 8 or (g) of FIG. 9 or, alternatively, a similar pole tip structure produced by equivalent methods.

Referring next to (b) of FIG. 10, there is shown schematically the fabrication of (a) of FIG. 10, where a photo-resist mask (160) has been deposited over the layer of main pole material (150) and an IBE process (170) is applied as shown. The IBE reduces the thickness of the unprotected portion of the layer of main pole material to a constant thickness $t_2$ in region (3) of the pole as required by the design of the pole.

Referring finally to (c) of FIG. 10, there is shown the fabrication of (b) of FIG. 10, where the photo-resist mask of (b) of FIG. 10 has been removed, leaving the tapered, variable thickness main pole of FIG. 5 and showing the thin region (3). At this point a top or bottom yoke may be affixed to the main pole and the main pole structure in the PMR writer head fabrication is completed. In subsequent steps, optionally, a trailing shield a side shield and a leading shield can be added according to the design of the rest of the writer structure.

As is understood by a person skilled in the art, the preferred embodiment of the present invention is illustrative of the present invention rather than limiting of the present invention. Revisions and modifications may be made to methods, materials, structures and dimensions employed in forming and providing a variable thickness, tapered main pole for a PMR head, while still forming and providing such a main pole and its method of formation in accord with the spirit and scope of the present invention as defined by the appended claims.

What is claimed is:
1. A PMR head comprising:
   a tapered main pole having a distal ABS end, a trailing edge and a leading edge and a thickness in an x-direction that measures the perpendicular separation between said leading edge and said trailing edge, wherein said thickness varies in a y-direction extending proximally from said ABS end and wherein the cross-sectional shape of said main pole in an x-y plane further comprises:
   a tapered first region, said taper widening proximally from said ABS to attain a maximum thickness, $t_1$, whereupon the taper terminates;

a second region, being a region of constant maximum thickness $t_1$, continuous with and extending proximally from said first region;

a third region, being a proximal end having a uniform minimum thickness, $t_2$, where $t_2$ is smaller than $t_1$; and a fourth region, being a transition region of varying thickness, providing a continuous transition between said second region of constant maximum thickness $t_1$ and said third region of constant minimum thickness $t_2$; and wherein the combined length in the y-direction of the first region and second region is denoted L.

2. The PMR head of claim 1 further comprising a shield configuration of a leading shield and side shields, wherein flux emitted from said shields do not create adjacent track erasures (ATE) or wide area track erasures (WATE).

3. The PMR head of claim 1 wherein a yoke is formed in physical and magnetic contact with said main pole on a leading edge of said third region or on a trailing edge of said third region.

4. The PMR head of claim 1 wherein the taper of said first region is formed by a bevel on a leading edge, a bevel on a trailing edge, or a bevel on both a trailing edge and a leading edge.

5. The PMR head of claim 1 wherein L is between approximately 0.3 microns and 1.5 microns.

6. The PMR head of claim 1 wherein $t_1$ is between approximately 0.15 microns and 0.5 microns.

7. The PMR head of claim 1 wherein $t_2$ is between approximately 0.05 microns and 0.35 microns.

8. The PMR head of claim 1 wherein said fourth region is formed by a bevel on the trailing edge surface of said main pole at a distance L measured proximally from said ABS, wherein said bevel makes an angle $\alpha$, between approximately 15° and 90° measured towards the leading edge from said trailing edge of said main pole and wherein said bevel terminates when it produces a thickness $t_2$ in said third region.

9. The PMR head of claim 1 wherein said fourth region is formed by a bevel on the leading edge surface of said main pole at a distance L from said ABS, wherein said bevel makes an angle $\alpha$, between approximately 15° and 90° measured from said leading edge towards the trailing edge of said main pole and wherein said bevel terminates when it produces a thickness $t_2$ in said third region.

10. The PMR head of claim 1 wherein said fourth region comprises two continuous transition regions, wherein the first of said two transition regions is formed by a first bevel on the trailing edge surface of said main pole at a distance $L_1$ from said ABS, wherein said bevel makes an angle $\alpha_1$, between approximately 15° and 90° measured from said trailing edge towards the leading edge of said main pole and wherein said first bevel terminates when it produces a thickness $t_3$ in said first transition region and wherein said second transition region is formed by a second bevel on a leading edge of said main pole at a distance $L_2$ from said ABS, wherein said second bevel makes an angle $\alpha_2$, between approximately 15° and 90° measured from said leading edge towards the trailing edge of said main pole and wherein said second bevel terminates when a thickness $t_2$ is created in said second transition region.

11. The PMR head of claim 10 wherein $L_1$ and $L_2$ are each between approximately 0.3 microns and 1.5 microns.

12. The PMR head of claim 1 wherein said fourth region comprises two contiguous transition regions, wherein the first of said two transition regions is formed by a first bevel on the leading edge surface of said main pole at a distance $L_1$ from said ABS, wherein said bevel makes an angle $\alpha_1$, between approximately 15° and 90° measured from said leading edge towards the trailing edge of said main pole and wherein said first bevel terminates when it produces a thickness $t_3$ in said first transition region and wherein said second transition region is formed by a second bevel on a trailing edge of said main pole at a distance $L_2$ from said ABS, wherein said second bevel makes an angle $\alpha_2$, between approximately 15° and 90° measured from said trailing edge towards the leading edge of said main pole and wherein said second bevel terminates when a thickness $t_2$ is created in said second transition region.

13. The PMR head of claim 10 wherein $L_1$ and $L_2$ are each between approximately 0.3 microns and 1.5 microns.

14. A method of forming a main write pole for PMR head, comprising:

providing a substrate;

forming a material layer on the substrate;

forming a first photo-resist mask on said material layer;

etching a first trench in said material layer using said mask and a first etching process;

removing said first mask and forming a second photo-resist mask;

using said second photo-resist mask and a second etching process, deepening said first trench; then removing said second photo-resist mask; and depositing a layer of main pole material conformally filling said substrate trench to a maximum thickness $t_1$;

planarizing the upper surface of said layer of main pole material; then creating a beveled edge on a portion of said upper surface.

15. A method of forming a main write pole for PMR head, comprising:

providing a substrate forming a layer of a first material on the substrate;

forming a metal etch-stop layer on said layer of first material;

forming a second layer of said first material over said first layer and said etch-stop layer;

forming a photo-resist mask on said second layer;

using a first etching process, etching a trench through said second layer and said first layer using said photo-resist mask and said etch-stop layer to form a variable depth trench bounded by oppositely angled sloping sides of unequal length; then removing said photo-resist mask;

depositing a layer of main pole material conformally filling said substrate trench to a maximum thickness $t_1$;

planarizing the upper surface of said layer of main pole material; then creating a beveled edge on a portion of said planarized upper surface of said layer of main pole material using a second etching process.

16. The method of claim 14 further comprising:

forming a photo-resist mask over said layer of main pole material, wherein said photoresist mask covers said beveled edge and extends partially over the non-beveled portion;

using said photo-resist mask and a third etching process, etching away a portion of said layer of main pole material to reduce the thickness of said layer to $t_2$.

17. The method of claim 15 further comprising:

forming a photo-resist mask over said layer of main pole material, wherein said photo-resist mask covers said beveled edge and extends partially over the non-beveled portion;

using said photo-resist mask and a third etching process, etching away a portion of said layer of main pole material to reduce the thickness of said layer to $t_2$.

18. The method of claim 16 wherein $t_1$ is between approximately 0.15 microns and 0.5 microns.

19. The method of claim 16 wherein $t_2$ is between approximately 0.05 microns and 0.35 microns.

20. The method of claim 17 wherein $t_1$ is between approximately 0.15 microns and 0.5 microns.

21. The method of claim 17 wherein $t_2$ is between approximately 0.05 microns and 0.35 microns.

22. The method of claim 17 wherein said main pole material is deposited by plating or sputtering alloys of Fe and Co.

23. The method of claim 16 wherein said main pole material is deposited by plating or sputtering alloys of Fe and Co.

24. The method of claim 14 wherein said material layer is formed of $Al_2O_3$.

25. The method of claim 15 wherein said first material is $Al_2O_3$.

26. The method of claim 16 wherein said first and second etching processes are ion beam etches or reactive ion etches and said third etching process is an ion beam etch.

27. The method of claim 17 wherein said first and second etching processes are reactive ion etches and said third etching process is an ion beam etch.

* * * * *